Patented Mar. 14, 1950

2,500,489

UNITED STATES PATENT OFFICE 2,500,489

MANUFACTURE OF MELAMINE AND RESINOUS PRODUCTS THEREFROM

Colver P. Dyer, Winchester, Mass., assignor to Monsanto Chemical Company, St. Louis, Mo., a corporation of Delaware No Drawing. Application June 5, 1946, Serial No. 674,631

3 Claims. (Cl. 260—249.5)

The present invention relates to the manufacture of melamine, and resinous products prepared therefrom. More particularly, the present invention relates to the manufacture of melamine having improved color properties so that aldehyde resinous products prepared therefrom possess improved color characteristics.

It is well known to manufacture melamine by heating dicyandiamide and liquid ammonia at elevated temperatures. Thus, Franklin, "Journal of the American Chemical Society," volume 44, page 504, 1922, describes such a process. Many modifications of this process have been attempted. Thus, U. S. Patent 2,170,491 to Gustave Widmer and Willi Fisch describes a process wherein dicyandiamide and ammonia are heated under varying and carefully controlled temperatures and pressure conditions.

However, when melamine is prepared by heating commercial dicyandiamide and ammonia under positive pressure, even under carefully controlled conditions, although good yields of relatively pure melamine may be obtained, on reacting with formaldehyde to produce condensation or reaction products, the condensation or reaction products obtained are found to be markedly discolored. This discoloration of the resins is so great as to limit and, in some cases, prohibit their use.

An object of the present invention is to provide a process for the preparation of melamine.

Another object is to provide melamine from which aldehyde condensation products having improved color are obtained.

Another object is to provide melamine-formaldehyde condensation products having improved color characteristics.

These and other objects will be apparent as hereinafter described.

In accordance with this invention, it has been found that on the incorporating of relatively small proportions of activated carbon, such as, for example, Norite SG, a highly adsorbent carbon, to the dicyandiamide prior to its conversion by heating to melamine, a marked improvement in the melamine so formed is obtained, which is in particular noted by the improvement in color of the formaldehyde-melamine reaction products prepared therefrom.

*Example I*

As a specific example of this invention, 100 parts by weight of commercial dicyandiamide and 70 parts by weight of liquid ammonia together with 1 part by weight of Norite SG were placed in an autoclave and heated gradually over a period of about 1 hour to a temperature of about 122° C. and a positive pressure of about 450 pounds per square inch, at the end of which time the temperature and pressure rose rapidly to a temperature of about 335° C. and a pressure of about 1000 pounds per square inch respectively, where they remained for a short time. The reaction vessel and contents were allowed to cool, the pressure released and the melamine removed from the reactor. By this process, yields of 95% of high quality melamine are obtained.

*Example II*

In order to show its improvement in discoloration when converted into melamine-formaldehyde resins, 126 grams of the melamine obtained by the process of Example I (1 molecular proportion) was reacted with 203 grams of 37% aqueous formaldehyde solution (2.5 molecular proportions) by heating at a temperature of substantially 95° C. in the presence of an amount of an aqueous sodium hydroxide catalyst sufficient to make the solution alkaline to phenolphthalein, for a sufficient period of time to produce a hydrophobe resin, for example, 1 hour. To the liquid resin so obtained there was added 50 ccs. of ethyl alcohol and the alcoholic solution filtered to eliminate the activated carbon and any insoluble material which might be present. Portions of this solution so obtained were then tested for color in accordance with the procedure set forth in "Standard Methods of Water Analysis" published by the American Public Health Association, New York, New York, 1936 edition, pages 12–14, and had a color index of 33.

*Example III*

Melamine was prepared by heating in an autoclave 100 parts by weight of dicyandiamide and 70 parts by weight of liquid ammonia, in the absence of activated carbon, but otherwise under the same conditions as Example I and reacted with formaldehyde in the same manner as described under Example II excepting that 1% Norite SG, based on the weight of the melamine, was added prior to the reaction with formaldehyde. Portions of the resin so obtained, on testing in the manner as described above had a color index of 58.

A similar melamine-formaldehyde resin, but in the manufacture of which Norite SG or other activated carbon was not added in either the resin manufacturing step or the melamine manufacturing step, had a color index, when determined by the method described under Example II, of 85.

It is thus apparent that by the present invention a marked advance has been obtained in the art of preparing melamine from dicyandiamide with an accompanying improvement in the aldehyde-melamine resins obtained therefrom. If preferred, the quantities of activated carbon employed in accordance with this invention may be widely varied and the process and products found to still exhibit the desired color inhibiting properties characteristic of the invention. It is generally preferred, however, that quantities of activated carbon varying between about 1/4% to 5% of the weight of the dicyandiamide charged be employed.

It will be noted that the melamine-formaldehyde resins herein have been variously referred to as reaction products or condensation products. These terms are used interchangeably in accordance with the practice in this art.

It is, of course, understood, as will be readily apparent to those skilled in the art to which this invention pertains, that activated carbon of this invention may be added to other proportions of dicyandiamide and ammonia than those specifically shown and the materials heated under positive pressure to produce an improved melamine. Further, it is to be understood that the melamine so obtained may be reacted with varying amounts of formaldehyde and catalyst to produce melamine-formaldehyde condensation products having improved color characteristics. The examples disclosed herein are to be understood as illustrative and in nowise limitative of the scope of the invention.

What is claimed is:

1. A method of manufacturing melamine which comprises first adding a small proportion of activated carbon to a mixture of dicyandiamide and ammonia, and heating the resulting mixture to form a melamine of improved color characteristics and which is capable of producing substantially colorless melamine-aldehyde condensation product when reacted with formaldehyde.

2. A method of manufacturing melamine which comprises first adding a small proportion of activated carbon to a mixture of dicyandiamide and ammonia, and heating the resulting mixture under positive pressure to form a melamine of improved color characteristics and which is capable of producing substantially colorless melamine-aldehyde condensation product when reacted with formaldehyde.

3. A method of manufacturing melamine which comprises first adding activated carbon to a mixture of dicyandiamide and ammonia, said carbon being added in an amount varying from 1/4 to 5% based on the weight of the dicyandiamide, and heating the resulting mixture under positive pressure to form a melamine of improved color characteristics and which is capable of producing substantially colorless melamine-aldehyde condensation product when reacted with formaldehyde.

COLVER P. DYER.

REFERENCES CITED

The following references are of record in the file of this patent:

UNITED STATES PATENTS

| Number | Name | Date |
| --- | --- | --- |
| 2,211,709 | Zerweck | Aug. 13, 1940 |
| 2,301,629 | King | Nov. 10, 1942 |
| 2,324,450 | Wintringham | July 13, 1943 |
| 2,396,193 | Paden | Mar. 5, 1946 |

FOREIGN PATENTS

| Number | Country | Date |
| --- | --- | --- |
| 420,525 | Great Britain | Nov. 26, 1934 |
| 554,262 | Great Britain | June 25, 1943 |
| 557,164 | Great Britain | Nov. 8, 1943 |

OTHER REFERENCES

Morton, "Laboratory Technique in Organic Chemistry," McGraw Hill, 1st edition, 1938, pages 181 and 182.